April 10, 1951 R. M. RANEY 2,548,558
STORAGE BATTERY
Filed Jan. 15, 1947 2 Sheets-Sheet 1

INVENTOR.
ROBERT M. RANEY
BY
Kwis, Hudson, Boughton & Williams
ATTORNEYS

April 10, 1951 R. M. RANEY 2,548,558
STORAGE BATTERY
Filed Jan. 15, 1947 2 Sheets-Sheet 2

INVENTOR.
ROBERT M. RANEY
BY
Kwis, Hudson, Boughton & Williams
ATTORNEYS

Patented Apr. 10, 1951

2,548,558

UNITED STATES PATENT OFFICE 2,548,558

STORAGE BATTERY

Robert M. Raney, Euclid, Ohio, assignor to Willard Storage Battery Company, Cleveland, Ohio, a corporation of West Virginia Application January 15, 1947, Serial No. 722,246

12 Claims. (Cl. 136—6)

This invention relates to storage batteries and, more particularly, to storage batteries suitable for use in portable radios, airplanes and other apparatuses in which the batteries may be subjected to tilting and/or inversion, and where the space provided for installation and servicing the batteries must be kept to a minimum.

An object of the invention is to provide an improved storage battery which is so constructed that it may be installed and/or filled even though accessible from only one side.

Another object of the invention is to provide an improved storage battery having terminals to which electrical connections may be readily made without the use of a wrench or other tool.

Another object of the invention is to provide an improved storage battery having its terminals formed as jacks or plugs so that electrical connections may be made thereto by complementary shaped connectors.

Another object of the invention is to provide an improved storage battery so constructed and arranged that it may be tilted or inverted without spilling the electrolyte contained therein.

Another object of the invention is to provide an improved storage battery having jack or plug type terminals disposed at one side of the battery and the filling opening or openings disposed at the opposite side of the battery, whereby the battery may be easily installed and serviced even though accessible from only one side.

A further object of the invention is to provide an improved storage battery having its terminals and filling opening so constructed and arranged that the battery may be installed and serviced in a much smaller space than conventional batteries of the same capacity.

A still further object of the invention is to provide an improved container or casing for a storage battery having provisions for filling, venting, charge indicating, and terminal connections so disposed that a battery constructed therewith may be more easily installed and serviced.

Other objects and advantages of the invention reside in various features of construction, combinations and arrangements of parts, as will hereinafter become more clearly apparent from the following detailed description of a preferred embodiment illustrated in the accompanying drawings and in which.

Figure 2:
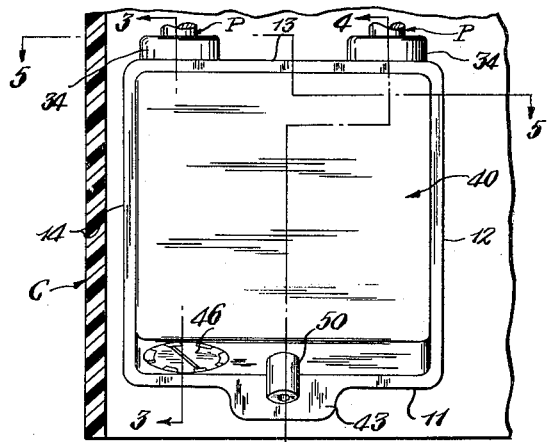
Fig. 2 is a sectional view through the radio cabinet, the view being taken substantially on the line 2—2 of Fig. 1 with the battery shown in top elevation.
Figure 1:
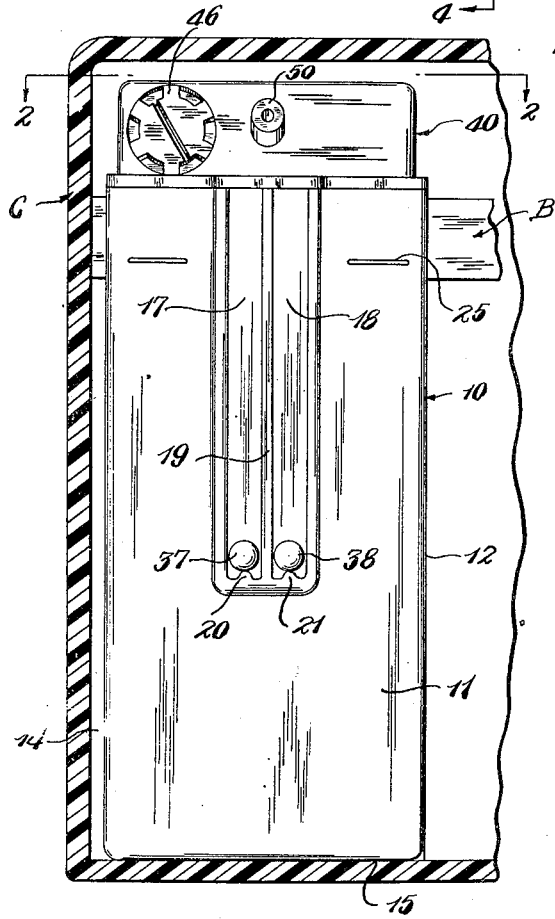
Fig. 1 is a fragmentary rear view of a portable radio cabinet and showing a storage battery embodying the present invention installed therein.
Figure 3:
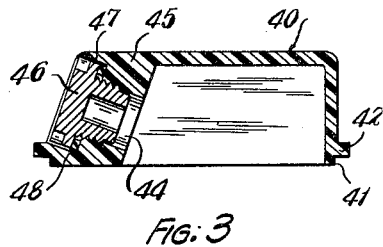
Fig. 3 is a sectional view through the top or cover of the battery taken substantially on the line 3—3 of Fig. 2.

The present preferred form of a storage battery embodying this invention is illustrated in the drawings as being relatively small and compact in size and of single cell construction. It will, however, be apparent that the battery may have any desired number of cells and be of any suitable size depending upon the particular use to which it is to be put. As illustrated, the battery comprises a hollow, substantially prismatic casing or container 10, preferably rectangular in cross section, having integral side and bottom walls 11, 12, 13, 14 and 15, respectively. This casing may be formed from any suitable material, but preferably is made from acid resistant transparent plastic, such as polystyrene, or the like. The casing or container may be formed by casting or molding, or by other well known processes, and one side wall thereof, such as 11, is preferably provided with a longitudinally extending projection or offset 16, the interior of which is hollow and communicates with the interior of the main part of the casing. This projection 16 is preferably divided into two parallel chambers 17 and 18 by an integral rib 19, the inner end of which terminates substantially in the plane of the inner face of the wall 11. The bottom of each of the chambers 17 and 18 is preferably provided with a small upstanding projection or rib 20, 21, respectively, for a purpose hereinafter described.

Within the battery container or casing 10 are disposed a plurality of lead plates of the same general type of construction as generally employed in storage batteries; that is to say, each plate may comprise a grid formed of lead or lead alloy and active material applied to the grid in the form of paste. As will be seen from Fig. 4, a plurality of positive and negative plates 22 and 23 are alternately arranged within the container and spaced from each other by suitable separators 24, and from the walls and bottom of the container by suitable liners 24a. These separators and liners are preferably formed of porous absorbent material and may be constructed of redwood fibers, such as disclosed in U. S. Patent No. 2,314,203 issued on March 16, 1943, to Edward Fairclough and entitled "Battery Separator." As will be seen from Figs. 4 and 5, substantially the entire cross-sectional area of the battery container is filled by the battery plates 22, 23, and by the separating and lining material 24 and 24a.

The electrolyte, which ordinarily is sulphuric acid solution, is filled into the battery to a height slightly above the tops of the battery plates and separators, the level of the liquid being preferably aligned with indications 25 marked upon one or more side walls of the casing or container. In the completed battery the main body of the electrolyte is absorbed by the porous separators and liners and held in contact with the plates so that there is a relatively small amount of free liquid. This construction, in addition to reducing the quantity of free liquid to a relatively small amount, is also advantageous because the separators and liners aid in retaining the active material upon the battery plates 22 and 23 so that the battery may be subjected to more severe shocks and rougher handling without damage than in prior constructions.

The upper edge of each of the battery plates is provided with a projection or lug 26, the lugs on the positive plates being united with a connecting strap 27 and the lugs on the negative plates being united with a connecting strap 28 in the customary manner. If desired, a strip or strips of insulating material 28a may be placed between the connecting straps and the tops of the plates and separators. These connecting straps are each preferably provided with an upstanding, substantially U-shaped, projection 29 adjacent to, but spaced from the side wall 13 of the battery casing or container, and this side wall of the casing is provided with a pair of circular openings, each of which is concentric about the centerline of the opening in the corresponding U-shaped projection 29. Disposed within each of these circular openings is a grommet 30 of acid resistant rubber or like material, and passing through each of said grommets is a battery terminal member 31.

Figure 4:
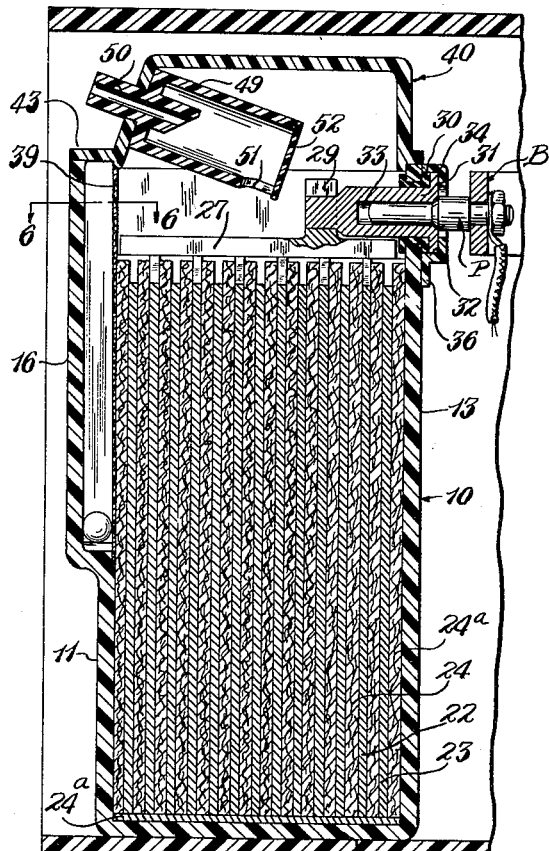
Fig. 4 is a sectional view taken substantially on the line 4—4 of Fig. 2.
Figure 5:
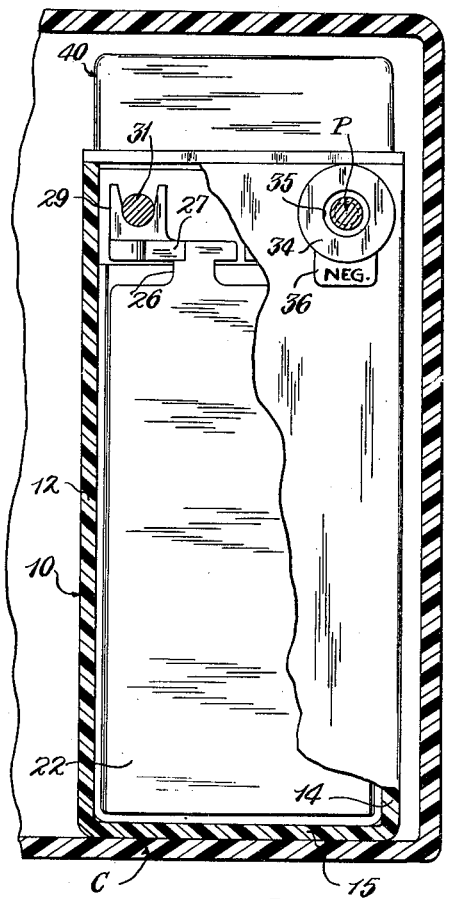
Fig. 5 is a sectional view substantially on the line 5—5 of Fig. 2.
Figure 6:
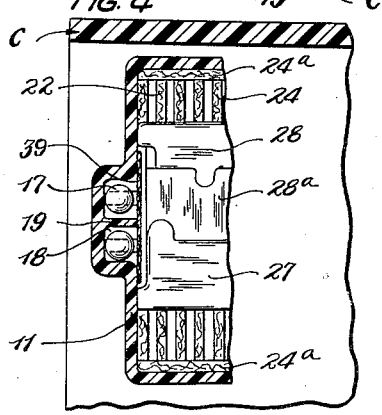
Fig. 6 is a fragmentary sectional view taken substantially on the line 6—6 of Fig. 4 and looking in the direction indicated by the arrows.

As will be seen from Fig. 4, the battery terminal members 31 are substantially cylindrical and have their inner ends, which may be reduced in diameter, received within the openings of the U-shaped projections 29 provided on the plate connectors 27 and 28, the projections 29 being united with the said reduced portions of the terminal members 31 by burning or other means such as are conventionally used in battery constructions. The outer end of each of the battery terminals 31 comprises a circular flange 32 which firmly engages the outer face of the grommet 30 to effect sealing of the opening through the wall 13 of the battery container. Extending longitudinally within each terminal member 31 is an opening, preferably a cylindrical bore 33, terminating short of the reduced diameter portion of the member. These openings or bores 33 constitute jacks to which electrical connections may be made by means of conductors provided with complementary shaped plugs P by simply inserting the plugs within the openings 33. Alternatively the battery terminals may be made in the form of plugs for cooperation with jacks associated with conductors.

Preferably, each of the battery terminals 31 is covered by a cap member 34 of insulating material which may be formed from the same type of material as that used in the construction of the battery casing, the caps 34 being united with the casing of the battery by fusing, by adhesive, or by use of a suitable solvent. Each cap 34 is provided with a central opening 35 aligned with the bore 33 in the battery terminal to enable the insertion of a connecting plug therein. The caps 34 each preferably have a downwardly extending projection 36 upon which suitable indicia may be placed indicating the polarity of the terminal with which the cap is associated.

In order to indicate the condition of the battery, the chambers 17 and 18, formed in the side wall 11, are each provided with a charge indicating sphere 37 and 38, respectively. These spheres have different specific gravities and preferably are of different colors, their diameters being slightly less than the smallest cross-sectional dimension of the chambers 17 and 18 so as to freely rise and fall therein in response to changes in the specific gravity of the electrolyte, as is well known in the art. The projections or ribs 20 and 21, respectively, previously mentioned as provided in the bottom of the chambers, are engaged by the spheres in their lowermost positions and assist in preventing the spheres from sticking to the bottoms of the chambers. As shown in the drawings, both spheres are at their lowermost positions, but it will be obvious that during the use of the battery they will be disposed at different heights within the chambers 17 and 18 depending upon the condition of charge of the battery. In order to prevent the spheres from being dislodged from their respective chambers, the latter are preferably separated from the main body of the casing or container by a sheet 39 of glass wool or the like, which may be cemented or otherwise secured to the inner face of the side wall 11. This will retain the spheres within their chambers without interfering with the free circulation of the electrolyte therein.

The top or cover 40 of the container of the storage battery is preferably formed separate from the main body of the container or casing 10, and has a substantially planar top surface of rectangular shape with depending side walls, the lower edges of the latter being formed as a downwardly extending flange 41 which fits within the upper ends of the side walls 11, 12, 13 and 14 of the container 10. The cap or cover 40 is also provided with a horizontally extending flange 42, spaced slightly above the lower edge of the flange 41, which has a length such as to terminate substantially flush with the outer surface of the side walls of the container. The flange 42 also has a projection 43 which extends over and closes the upper ends of the chambers 17 and 18 of the container 10. This top or cover 40 is preferably made of the same material as employed in the main body of container 10 and is sealed thereto as by fusing, by suitable adhesive, or by treating the edges of the top and/or the container with a suitable solvent.

In order to facilitate the addition of electrolyte or other liquid to the battery after it has been thus assembled, the side of the top or cover 40, adjacent the charge indicating chambers 17 and 18, is provided with a filling opening 44. For this purpose this side of the top or cover is sloped at an angle inclined to the vertical and the said top 40 is provided with an integral enlarged portion 45 through which the said filling opening 44 extends at an angle. A portion of the filling opening 44 is threaded and the outer end of the opening is counter-bored to receive a threaded filling plug 46 having a flange 47. A washer 48 of rubber or like material may be provided between the flange 47 and boss 45 to provide proper sealing when the plug is inserted in the filling opening.

Obviously, the filling plug 46 could be provided with an air vent in the conventional manner. However, in order to prevent spilling of the electrolyte of the battery if the latter should be shaken or tilted, an air venting means, provided with a liquid trap, is employed. This improved venting means may be formed in the plug 46 but preferably the latter has no opening therein. Instead, the air venting means comprises a hollow, substantially cylindrical, tube or member 49 having one end closed and provided with a smaller tube 50 extending both within and exteriorly of the member 49. Preferably, the cylinder 49 and the tube 50 are formed from the same material employed for the cap 40 and the cylinder and tube are formed integrally in the manner illustrated in Fig. 4. Adjacent the end of the cylindrical member 49, opposite to that in which the tube 50 is positioned, there is provided an opening 51 which is located on the lowest portion of the cylindrical member 49 when the cap is in its upright position. The end of the cylindrical member 49 adjacent the opening 51 is closed by a circular disk or plate 52 which may be fused, cemented or otherwise attached to the cylindrical member 49.

The dimensions of the top or cover 40 and of the cylindrical member 49 are preferably such that if the battery be completely inverted, the electrolyte may be contained within the cap member without rising to a height sufficient to enter the opening 51, and hence the liquid cannot flow from the battery. Even though some liquid might possibly enter the cylindrical member 49, due to splashing or the like, the extension of the small tube 50 into the interior of the member 49 will prevent the liquid from readily flowing through the air vent provided by the bore through the tube 50. Thus, the cylindrical member 49 and the tube 50 provide a liquid trap for any liquid which might enter the cylindrical member 49 if the battery should be inverted, and the liquid so trapped will readily drain through the opening 51 into the battery when the latter is again returned to its upright position. Preferably the inner end of the tube 50 is cut off at an angle to the axis thereof as indicated in Fig. 4. It will, therefore, be apparent that a battery constructed as illustrated and described is practically "spill proof," since only a relatively small quantity of free liquid is employed therein, the air vent is so arranged that the battery may be completely inverted without the electrolyte flowing therethrough, and the terminals are applied in a manner such that leakage thereabout is practically impossible.

The construction of the battery illustrated is such as to peculiarly adapt it for use in a very small space where only one side of the battery is readily accessible. As an example of such a use the battery is shown installed in the cabinet or housing C of a portable radio. This cabinet may be constructed of any suitable material but is here illustrated as formed in one piece of plastic or the like, the rear side being left open or closed by a removable cover as may be desired. Within the cabinet, and preferably adjacent one side thereof, a pair of plugs P are rigidly mounted by means of a suitable bracket B, by an integral boss provided on the cabinet, or by similar means. The plugs are complementary to and aligned with the jacks 33 of the battery so that electrical connection of the latter to the radio circuit may be made by simply inserting the battery into the cabinet C in the same manner as an electrical appliance cord is connected with the appliance, each of the plugs having a conductor leading therefrom to the power input circuit of the radio. Hence, it is not necessary that the top of the battery be accessible for effecting the electrical connections and, moreover, the connections may be rapidly made without the use of a wrench or other tool.

If desired, the battery terminals may be formed as plugs and the stationary connectors P formed as jacks. The illustrated construction is preferred, however, since the insulating caps 34 over the terminals protect the latter from being inadvertently grounded or short circuited. Moreover, since the bores 33 into which the plugs are inserted are completely sealed from the interior of the battery, corrosion of the connections is greatly reduced, if not entirely eliminated.

If desired, the separate filling opening 44 may be omitted, in which event liquid is added to the battery through the air venting tube 50. This may be accomplished by means of a syringe having a tubular outlet whose outside diameter is less than the internal diameter of the tube 50, the air which is displaced from the battery by the liquid introduced therein being vented through the tube 50 around the tubular syringe outlet. When the liquid is to be added in this manner, the opening 51 may be replaced by, or supplemented by, an opening in the disk or plate 52, this latter opening being aligned with the bore of the tube 50 so that the end of the syringe may freely extend through the disk or plate 52.

The location of the filling opening, air vent, and charge indicator on the side of the battery opposite to that provided with the terminal members is particularly advantageous in locations where it is impossible to secure access to the top of the battery; for example, in the cabinet of a portable radio of the type mentioned above. In addition, this location of the filling opening enables the battery to be filled without danger of spilling the water or electrolyte over other parts of the apparatus. Furthermore, if any of the electrolyte should be carried out of the battery, in the form of vapor or fine droplets passing through the air venting means, the location of the latter and its inclination prevent the vapors and/or droplets from condensing within the cabinet with consequent corrosion of the apparatus therein. Moreover, the location of the filling opening and the charge indicating means on the side of the battery, opposite to that on which the terminals are located, enables the electrolyte of the battery to be replenished, and the level thereof and the charge of the battery to be determined, without the necessity of disturbing the electrical connections and without interference therefrom. Finally, although the invention is not limited thereto, the construction of the battery casing or container 10 and the top or cover 40 of polystyrene or like clear plastic provides an attractive appearance and enables a ready inspection of the interior of the battery at all times.

As is well known in the art, a lead-acid storage battery frequently gives off hydrogen gas during charging and also occasionally gives off a small amount of this gas when idle, the latter being due to local action in the negative plates. Hence, if a flame or spark should pass adjacent the air vent of the battery an explosion might occur. This danger may be obviated by placing a fibrous substance, such as glass wool or the like, in the tube 50 and/or in the tube 49. Hence, any hydrogen which is liberated and ignited would burn harmlessly at the outer end of tube 50 since the fibrous material would provide the well-known Davy safety lamp effect and prevent the flame from entering the battery casing.

While one preferred embodiment of the invention has been illustrated and described in considerable detail, it will be readily understood that numerous modifications and changes can be made therein by one skilled in the art and, therefore, the invention is not limited to the exact constructions illustrated and described but only as required by the spirit and scope of the appended claims.

Having thus described my iinvention, I claim:

1. A storage battery comprising an insulating casing including side walls and a cover sealed to said side walls, positive and negative battery plates in the casing in contact with an electrolyte therein, separate connecting means within said casing uniting the plates of opposite polarity, one of the side walls of the casing having a pair of spaced openings therethrough intermediate the normal level of the electrolyte in the casing and the sealed cover thereof, and battery terminal members connected respectively with the battery plate connecting means interiorly of said casing, the said battery terminal members each having a portion extending respectively through one of said openings in sealed relationship with the casing, each of said battery terminal members having an opening extending longitudinally therein from the outer end thereof adapted to receive the end of an electrical conductor, the said openings in the terminal members terminating within the said members so that the side walls and bottoms of said openings are formed by continuous impervious portions of said members whereby the said conductor receiving openings are entirely sealed from the interior of the battery casing so that the electrolyte of the battery cannot come into contact with the conductors.

2. A storage battery comprising an insulating casing including side walls and a cover sealed to said side walls, positive and negative battery plates in the casing in contact with an electrolyte therein, separate connecting means within said casing uniting the plates of opposite polarity, one of the side walls of the casing having a pair of spaced openings therethrough intermediate the normal level of the electrolyte in the casing and the sealed cover thereof, battery terminal members disposed within said casing and connected respectively with the battery plate connecting means, the said terminal members each having an integral portion extending respectively through the said openings in the casing, sealing means between said integral portions of the terminal members and the casing, and an insulating cap over the portion of each terminal member extended exteriorly of the casing, each of said battery terminal members and insulating cap therefor having longitudinally extending aligned openings therein adapted to receive the end of an electrical conductor, the said openings in the terminal members terminating within the said members so that the side walls and bottoms of said openings are formed by continuous impervious portions of said members whereby the openings are entirely sealed from the interior of the battery casing so that the electrolyte of the battery cannot come into contact with the conductors.

3. A storage battery comprising an insulating casing including side walls and a cover sealed to said side walls with the said cover having an impervious top, positive and negative battery plates in the casing in contact with an electrolyte therein, separate connecting means within said casing uniting the plates of opposite polarity, one of the side walls of the casing having a pair of spaced openings therethrough intermediate the normal level of the electrolyte in the casing and the cover thereof, battery terminal members disposed within said casing and connected respectively with the battery plate connecting means, the said battery terminal members each having a portion extending through the said openings respectively in sealed relationship within the casing, the said battery terminal members each having an opening extending longitudinally therein from the outer end thereof adapted to interengage with a complementary shaped end of an electrical conductor, the said openings in the terminal members terminating within the said members so as to be entirely sealed from the interior of said casing by integral impervious portions of said members, the side of the casing opposite to that in which the battery terminals are provided having a filling opening, and a removable plug for closing the said filling opening.

4. A storage battery comprising an insulating casing including side walls and a cover sealed to the said side walls with the said cover having an impervious top, positive and negative battery plates in the casing in contact with an electrolyte therein, separate connecting means within said casing uniting the plates of opposite polarity, one of the side walls of the casing having a pair of spaced openings therethrough intermediate the normal level of the electrolyte in the casing and the cover thereof, a battery terminal member extending through each of the said openings in sealed relationship with said casing and respectively connected interiorly of said casing with the battery plate connecting means, the said battery terminal members each being formed to constitute one element of a jack and plug type connection and adapted to interengage a complementary shaped element of the connection upon the end of an electrical conductor, the said casing having a filling opening located in a different side of the casing from that in which the battery terminal members are provided, an air venting means for said casing separate from said filling opening and located in a side of said casing adjacent said filling opening, and a removable plug for closing said filling opening.

5. A storage battery comprising a main casing member formed of insulating material with an impervious top and integral, positive and negative battery plates in the casing member in contact with an electrolyte therein, separate connecting means uniting the plates of opposite polarity, one of the side walls of the main casing member having a pair of spaced openings therethrough, battery terminal members connected respectively with the battery plate connecting means and extending through said openings, the said battery terminal members each being formed to constitute one element of a jack and plug type connection and adapted to interengage a complementary shaped element of the connection upon the end of an electrical conductor, a cover member formed of insulating material with an impervious top and integral downwardly extending side walls united with the top of said main casing member in sealing relationship, the said cover member having a filling opening located in the side wall thereof which is opposite to that side of the casing in which the terminal members are located, a removable plug for closing said filling opening, and an air venting means including a liquid trap positioned in that side of said cover member which is provided with the filling opening, the said cover member and liquid trap being so constructed and arranged that the electrolyte cannot flow through the air vent when the battery is inverted.

6. A storage battery comprising a main casing member formed of insulating material, positive and negative battery plates in the casing member in contact with an electrolyte therein, separate connecting means uniting the plates of opposite polarity, one of the side walls of the main casing member having a pair of spaced openings therethrough, battery terminal members connected respectively with the battery plate connecting means and extending through said openings, the said battery terminal members each being formed to constitute one element of a jack and plug type connection and adapted to interengage a complementary shaped element of the connection upon the end of an electrical conductor, a cover member formed of insulating material and having downwardly extending side walls united with the top of said main casing member in sealing relationship, the said cover member having a filling opening located in the side wall thereof which is opposite to that side of the casing in which the terminal members are located, a removable plug for closing said filling opening, an air venting means positioned in that side of said cover member which is provided with the filling opening, the said venting means including a hollow tube having a portion extending through the said cover member and into the interior thereof, and a hollow cylindrical member surrounding the inner end of said hollow tube in sealing relationship, the said cylindrical member having an opening adjacent its lowermost point.

7. A storage battery comprising a main casing member formed of insulating material with an impervious top and integral, positive and negative battery plates alternately arranged in said casing member, porous separators interposed between adjacent plates and substantially in contact therewith, an electrolyte in said casing saturating said porous separators and extending above the top levels of said plates, separate connecting means uniting the plates of opposite polarity, one of the side walls of the main casing member having a pair of spaced openings therethrough, battery terminal members connected respectively with the battery plate connecting means and extending through said openings, each of said battery terminal members being formed to constitute one element of a jack and plug type connection and adapted to interengage a complementary shaped element of the connection upon the end of an electrical conductor, a cover member formed of insulating material with an impervious top and integral downwardly extending side walls united with the top of said main casing member in sealing relationship, the said cover member having a filling opening located in the side wall thereof which is opposite to that side of the casing in which the terminal members are located, a removable plug for closing said filling opening, and an air venting means in said cover member including a liquid trap positioned in that side of said cover member which is provided with the filling opening, the said cover member and liquid trap being so constructed and arranged that the free electrolyte of the battery is substantially contained within said cover member and cannot flow out of the battery through the air vent when the battery is inverted.

8. A storage battery comprising a hollow, substantially tetragonal prism-shaped, main casing member formed of transparent plastic with one of the side walls of said casing member having a longitudinally extending offset portion integral therewith, an integral rib extending longitudinally medially of said offset portion and defining two longitudinally extending chambers, positive and negative battery plates in the casing member in contact with an electrolyte therein, porous separating means interposed between the main body of the casing member and the offset portion thereof, a specific gravity indicating sphere in each of said longitudinally extending chambers for indicating the condition of said battery, separate connecting means uniting the plates of opposite polarity, the side wall of the casing member opposite to the longitudinally extending offset having a pair of spaced openings therethrough, battery terminal members connected respectively with the battery plate connecting means and extending through said openings, the said battery terminal members each being formed to constitute one element of a jack and plug type connection and adapted to interengage a complementary shaped element of the connection upon the end of an electrical conductor, a cover member having downwardly extending side walls uniting with the top of said main casing member in sealing relationship, the said cover member having a filling opening located in the side wall thereof which is in alignment with the side wall of the main casing having the longitudinally extending offset, a removable plug for closing said filling opening, and an air venting means in said cover member including a liquid trap positioned in that side of said cover member which is provided with the filling opening, the said cover member and liquid trap being so constructed and arranged that the electrolyte cannot flow through the air vent when the battery is inverted.

9. A storage battery container comprising a main casing member adapted to receive battery plates and electrolyte, the said casing member having spaced openings in one side thereof for terminal members connected with the battery plates, a cover member having an impervious top and integral downwardly extending side walls adapted to be positioned upon said main casing member and united therewith in sealing relationship, the said cover member being provided with a filling opening in one side wall thereof, a removable plug for closing said filling opening, an air venting means including a hollow tube extending obliquely through the side of said cover member which is provided with the filling opening, the said tube having a portion thereof extending interiorly of the cover member, and a hollow cylindrical member surrounding the inner end of said hollow tube in sealing relationship, the said cylindrical member having an opening adjacent its lowermost point.

10. A storage battery container comprising a main casing member formed of insulating material and adapted to receive battery plates and electrolyte, one side wall of the casing member being provided with a pair of spaced openings for the terminals of the battery, and a cover member having an impervious top and integral downwardly extending side walls adapted to be positioned upon said main casing member and united therewith in sealing relationship, the said cover member being provided with a filling opening in the side wall thereof which is opposite to that side of the casing member provided with the battery terminal openings.

11. A storage battery container comprising a hollow, substantially tetragonal prism-shaped, main casing member formed of transparent plastic and adapted to receive battery plates and an electrolyte, one of the side walls of said casing member having a longitudinally extending offset portion integral therewith, a longitudinally extending integral rib medially of said offset portion defining two chambers each adapted to receive a charge-indicating sphere, the side wall of said casing member opposite to the offset portion having a pair of spaced openings to receive the terminal members of the battery, a plastic cover member having an impervious top and integral downwardly extending side walls adapted to be positioned upon the upper edges of said main casing member and united therewith in sealing relationship, the side wall of said cover member which is in alignment with the side wall of the main casing member having the longitudinally extending offset being provided with a filling opening closed by a removable plug, and an air venting means including a liquid trap located in the side wall of said cover member adjacent said filling opening.

12. A cover member for a storage battery main casing member which is adapted to receive battery plates and an electrolyte with the terminal members that are connected with the battery plates extending through the side of the casing, the said cover member comprising an impervious substantially planar top and downwardly extending side walls adapted to be positioned upon the said casing member and united therewith in sealing relationship, one of the side walls of said cover member having a filling opening therethrough, an air venting means in that side wall of said cover which is provided with the filling opening, and a liquid trap for said air venting means located interiorly of said cover member.

ROBERT M. RANEY.

REFERENCES CITED

The following references are of record in the file of this patent:

UNITED STATES PATENTS

| Number | Name | Date |
|---|---|---|
| 635,287 | Andreas | Oct. 24, 1899 |
| 1,266,814 | Kammerhoff | May 21, 1918 |
| 1,829,935 | Klock | Nov. 3, 1931 |
| 1,907,766 | Everett | May 9, 1933 |
| 2,021,288 | Carlile | Nov. 19, 1935 |
| 2,209,185 | Bower et al. | July 23, 1940 |
| 2,349,031 | Doughty | May 16, 1944 |
| 2,414,210 | Quirk | Jan. 14, 1947 |

FOREIGN PATENTS

| Number | Country | Date |
|---|---|---|
| 108,849 | Great Britain | Feb. 28, 1918 |
| 388,550 | Great Britain | Mar. 2, 1933 |
| 494,348 | Great Britain | Oct. 25, 1938 |
| 512,741 | Great Britain | Sept. 25, 1939 |

OTHER REFERENCES

Wheat, Modern Plastics, August, 1941, page 50.

Willard, Scientific American, October, 1941, pages 214–5.

G. E., Electrical Engineering, August-September, 1946, page 35.